United States Patent

Murakami

[11] Patent Number: 5,758,840
[45] Date of Patent: Jun. 2, 1998

[54] PAPER MAGAZINE

[75] Inventor: Motoaki Murakami, Wakayama, Japan

[73] Assignee: Noritsu Koki Co., Ltd., Wakayama, Japan

[21] Appl. No.: 696,126

[22] Filed: Aug. 13, 1996

[51] Int. Cl.$^6$ .................. B65H 20/02; B65H 23/182; B65H 23/195
[52] U.S. Cl. .................. 242/415; 242/418; 242/420.4; 242/535.3; 242/564.4
[58] Field of Search .................. 242/535.3, 564.4, 242/415, 415.1, 418, 420.4, 348, 348.1, 348.2, 348.3, 348.4, 332–332.8

[56] References Cited

U.S. PATENT DOCUMENTS

| | | | |
|---|---|---|---|
| 2,392,226 | 1/1946 | Butterworth, Jr. et al. | 242/415 |
| 3,861,610 | 1/1975 | Landis et al. | 242/564.4 |
| 4,111,379 | 9/1978 | Luscher | 242/535.3 |
| 4,182,645 | 1/1980 | Hill . | |
| 4,227,678 | 10/1980 | Laky | 242/535.3 |
| 4,469,291 | 9/1984 | Treiber et al. | 242/535.3 |
| 4,928,897 | 5/1990 | Satou et al. | 242/564.4 |
| 5,181,066 | 1/1993 | Ozawa et al. . | |
| 5,362,008 | 11/1994 | Nagel et al. | 242/564.4 |
| 5,553,809 | 9/1996 | Oku | 242/564.4 |

*Primary Examiner*—John M. Jillions
*Attorney, Agent, or Firm*—Wenderoth, Lind & Ponack

[57] ABSTRACT

A paper magazine which can feed paper from a paper roll at high speed with high accuracy. Provided between a drive shaft and a paper feed roller are a normal rotation transmission for transmitting only the rotation of the drive shaft in the normal direction to the feed roller and a reverse rotation transmission for transmitting only the rotation of the drive shaft in the reverse direction to the feed roller. A rotation transmission mechanism is provided between the drive shaft and a core for nonrotatably supporting a paper roll to transmit both the normal and reverse rotations of the drive shaft to the core. To feed paper from the paper roll, the feed roller and the core are rotated in the paper feed direction, while controlling the rotating speed of the core so that the peripheral speed of the feed roller is higher than the peripheral speed of the paper roll when its diameter is maximum to apply suitable tension to the paper being fed. To rewind paper on the paper roll, the feed roller and the core are rotated in the paper rewinding direction, while controlling the rotating speed of the core so that the peripheral speed of the feed roller is lower than the peripheral speed of the paper roll when its diameter is minimum to apply suitable tension to the paper being rewound.

2 Claims, 8 Drawing Sheets

PAPER MAGAZINE

BACKGROUND OF THE INVENTION

This invention relates to a paper magazine for storing a roll of printing paper to be fed into a exposure unit of a photographic printing machine.

A photographic printing machine is used to print images on negatives onto photographic paper (hereinafter referred to simply as "paper") by shedding light on negatives. Paper is usually fed into the printer by unrolling from a paper roll housed in a paper magazine set on the printer.

One conventional paper magazine has a magazine case for housing a paper roll nonrotatably supported on a core rotatably mounted in the case. A feed roller and a press roller are provided along a paper feed path leading from the paper roll to a paper outlet provided in the magazine case. The paper sandwiched between the rollers is fed toward the paper outlet by rotating the feed roller. Rotation resistance is applied to the core to prevent the paper from slackening.

In this arrangement, if the paper is fed at higher speed to increase printing speed, the tension applied to the paper tends to increase correspondingly due to the resistance applied to the core. The increased tension will cause slip between the feed roller and the paper, making it difficult to feed paper with high accuracy.

An object of the present invention is to provide a paper magazine which can feed paper at high speed with high accuracy.

SUMMARY OF THE INVENTION

According to this invention, there is provided a paper magazine comprising a magazine case, a paper roll, a core for nonrotatably supporting the paper roll, a drive shaft driven in both directions, the core and the drive shaft being mounted in the magazine case, a feed roller provided along a paper feed path leading from the paper roll to a paper outlet provided in the magazine case, a press roller pressed against the feed roller, a normal rotation transmission provided between the drive shaft and the feed roller for transmitting only rotation of the drive shaft in a normal direction to the feed roller to rotate the feed roller in a direction to feed paper, a reverse rotation transmission provided between the drive shaft and the feed roller for transmitting only rotation of the drive shaft in a reverse direction to the feed roller to rotate the feed roller in a direction to rewind paper, and a rotation transmission mechanism provided between the drive shaft and the core for transmitting the rotations of the drive shaft both in the normal and reverse directions to the core, while controlling the rotating speed of the core so that while the drive shaft is rotating in the normal direction, the peripheral speed of the feed roller is higher than the peripheral speed of the paper roll when its diameter is maximum, and while the drive shaft is rotating in the reverse direction, the peripheral speed of the feed roller is lower than the peripheral speed of the core when its diameter is minimum, thereby applying a predetermined tension to the paper unrolled from the paper roll.

While the drive shaft is rotated in the normal direction, its rotation is transmitted through the normal rotation transmission to the feed roller. By the normal rotation of the feed roller, paper is fed toward the paper outlet.

At the same time, the rotation of the drive shaft is transmitted through the rotation transmission mechanism to the core, so that the paper roll is rotated in the direction to feed paper. The rotation transmission mechanism controls the rotating speed of the core so that the peripheral speed of the paper roll is slower than that of the feed roll to apply a predetermined tension to the paper being fed.

While the drive shaft is rotated in the reverse direction, its rotation is transmitted through the reverse rotation transmission to the feed roller to rotate the feed roller in reverse. Paper is thus rewound.

Simultaneously, the rotation of the drive shaft is transmitted through the rotation transmission mechanism to the core to rotate the core in the paper rewinding direction.

In this state, the rotating speed of the core is controlled so that the peripheral speed of the paper roll is faster than the peripheral speed of the feed roller, so that a predetermined tension is applied to the paper being rewound. It is thus possible to rewind paper without slackening or wrinkling.

Other features and objects of the present invention will become apparent from the following description made with reference to the accompanying drawings, in which:

DETAILED DESCRIPTION OF THE PREFERRED EMBODIMENT

Embodiments of this invention are described below with reference to the accompanying drawings.

Figure 1:
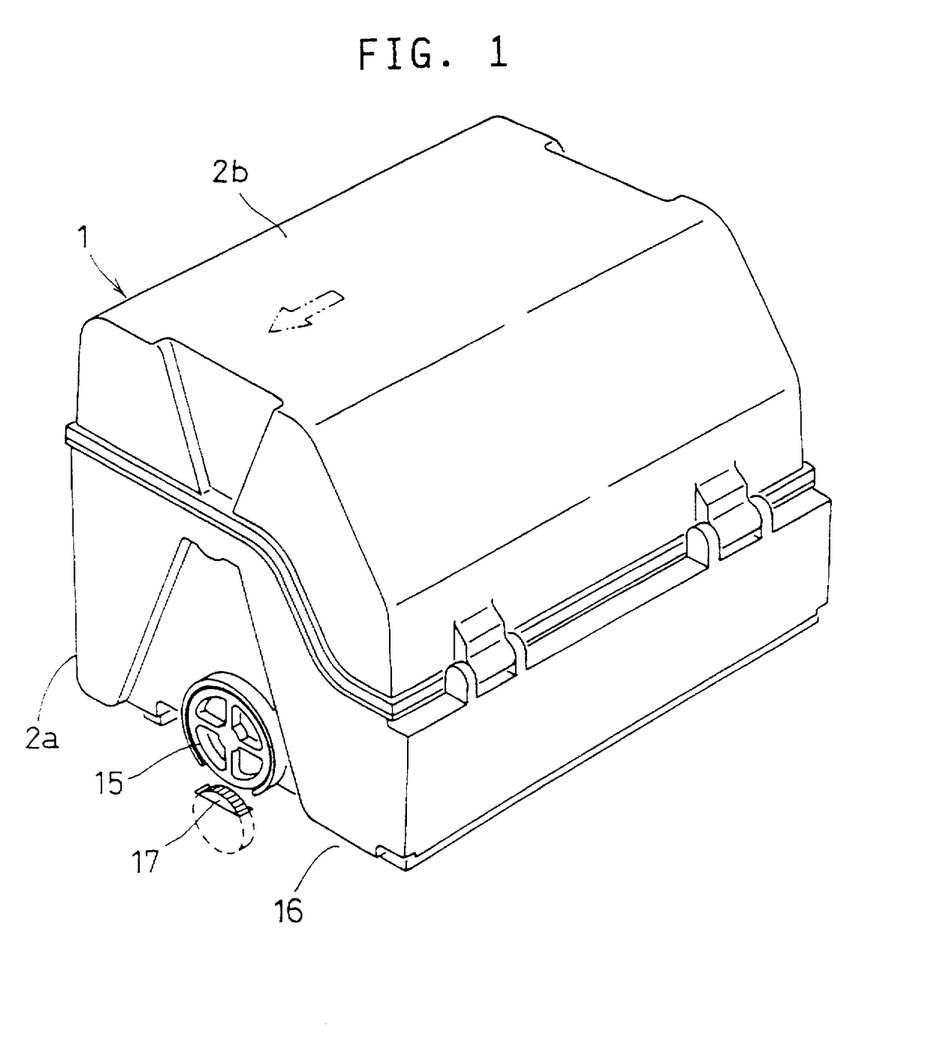
FIG. 1 is a perspective view of an embodiment of the paper magazine according to this invention.
Figure 3:
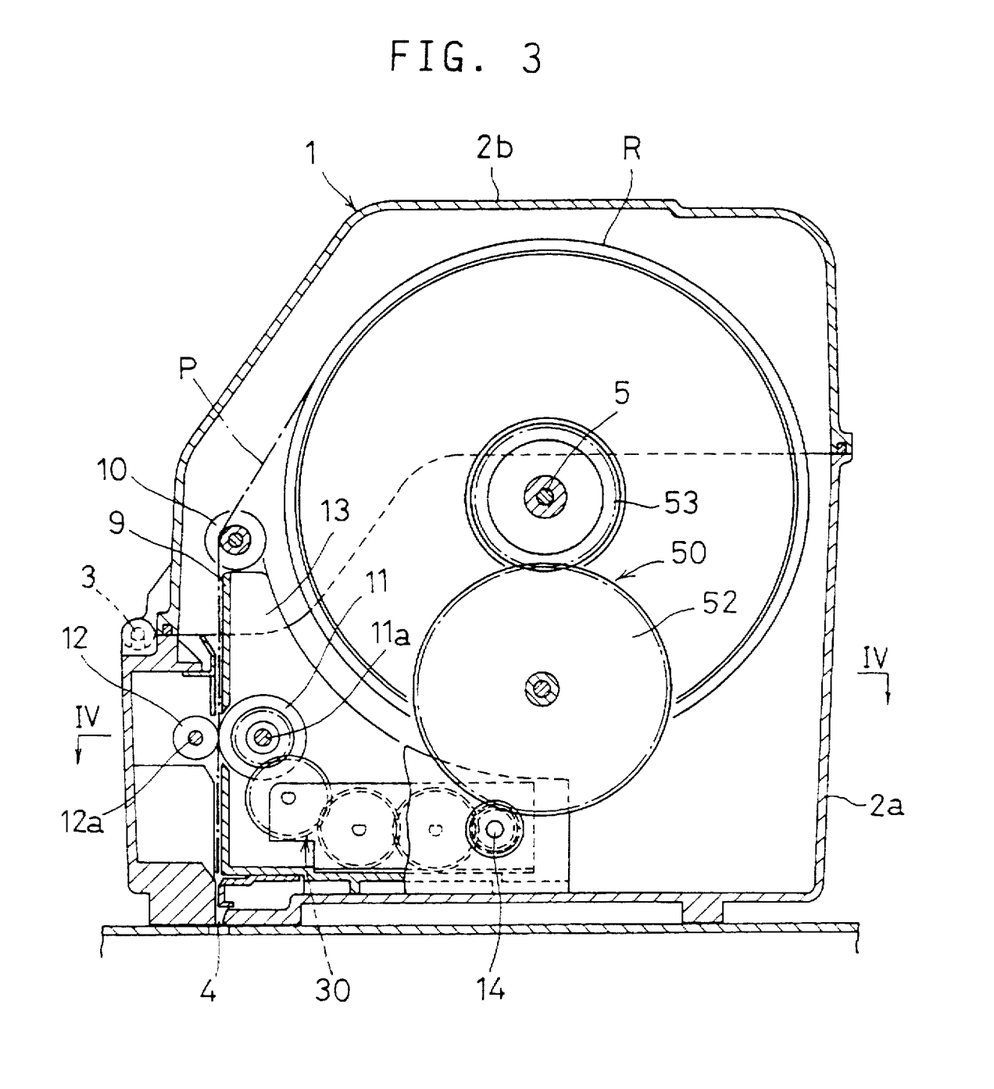
FIG. 3 is a sectional view taken along line III—III of FIG. 2.

As shown in FIG. 1, a magazine case 1 comprises a case body 2a and a cover 2b. As shown in FIG. 3, the cover 2b is mounted to the case body 2a so as to be pivoted around a pin 3 to close and open.

A paper outlet 4 is provided in the bottom plate of the magazine case 1 near its front end. A core shaft 5 is provided in the magazine case 1.

Figure 2:
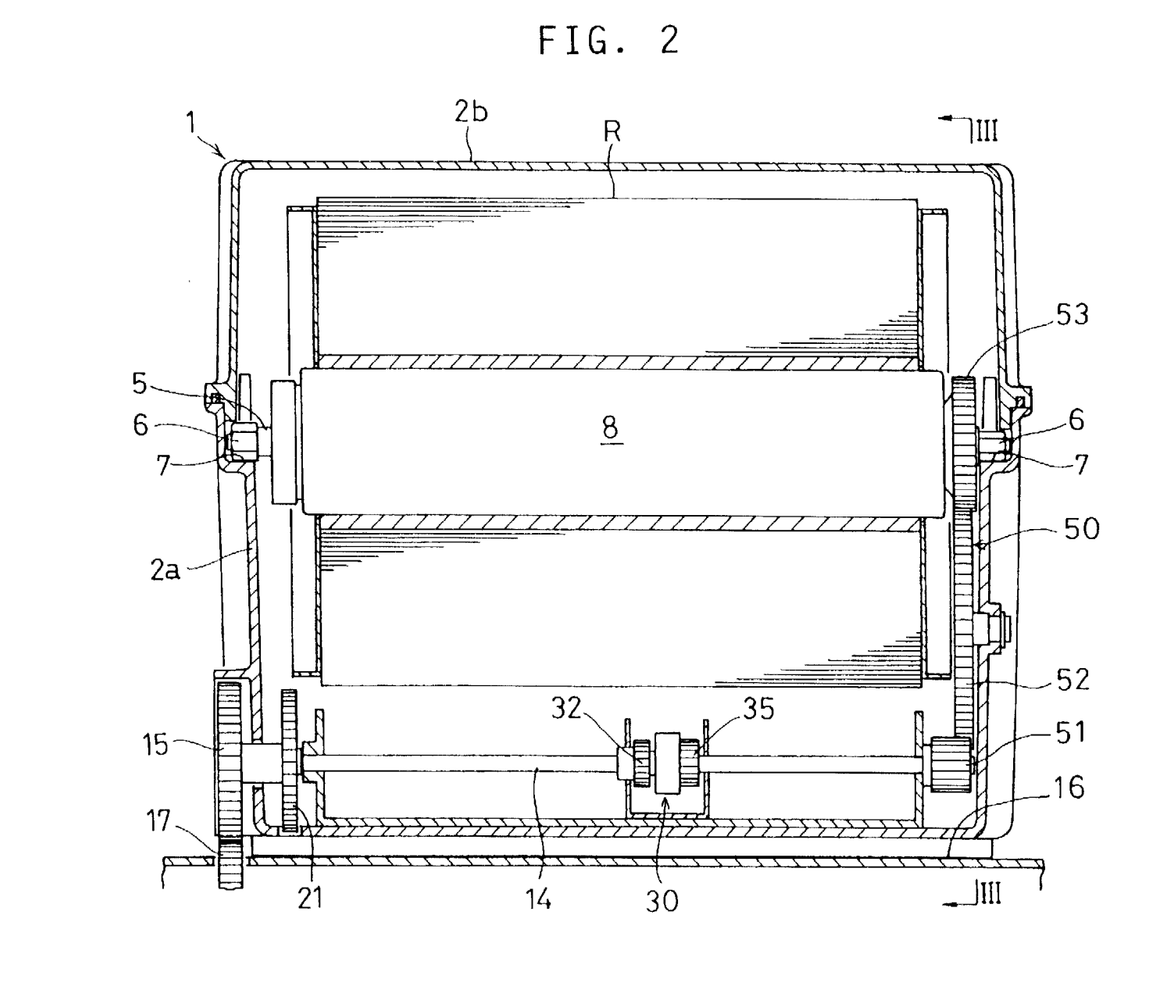
FIG. 2 is a vertical sectional front view of the same.

As seen in FIG. 2, bearing metals 6 are rotatably mounted on the core shaft 5 at both ends thereof. They are detachably supported on support portions 7 provided on the inner surfaces of side plates of the case body 2a.

A core 8 is rotatably mounted around the core shaft 5 to nonrotatably support a paper roll R. As shown in FIG. 3, a paper guide 9 is provided along a feed path of paper P that is unrolled from the paper roll R to the paper outlet 4.

A guide roller 10 for guiding paper P is rotatably mounted over the paper guide 9. Provided under the guide roller 10 are a feed roller 11 and a press roller 12 pressed against the feed roller 11. The feed roller 11 has a roller shaft 11a (FIG. 4) rotatably supported on side plates 13 provided on both sides of the paper guide 9.

Figure 4:
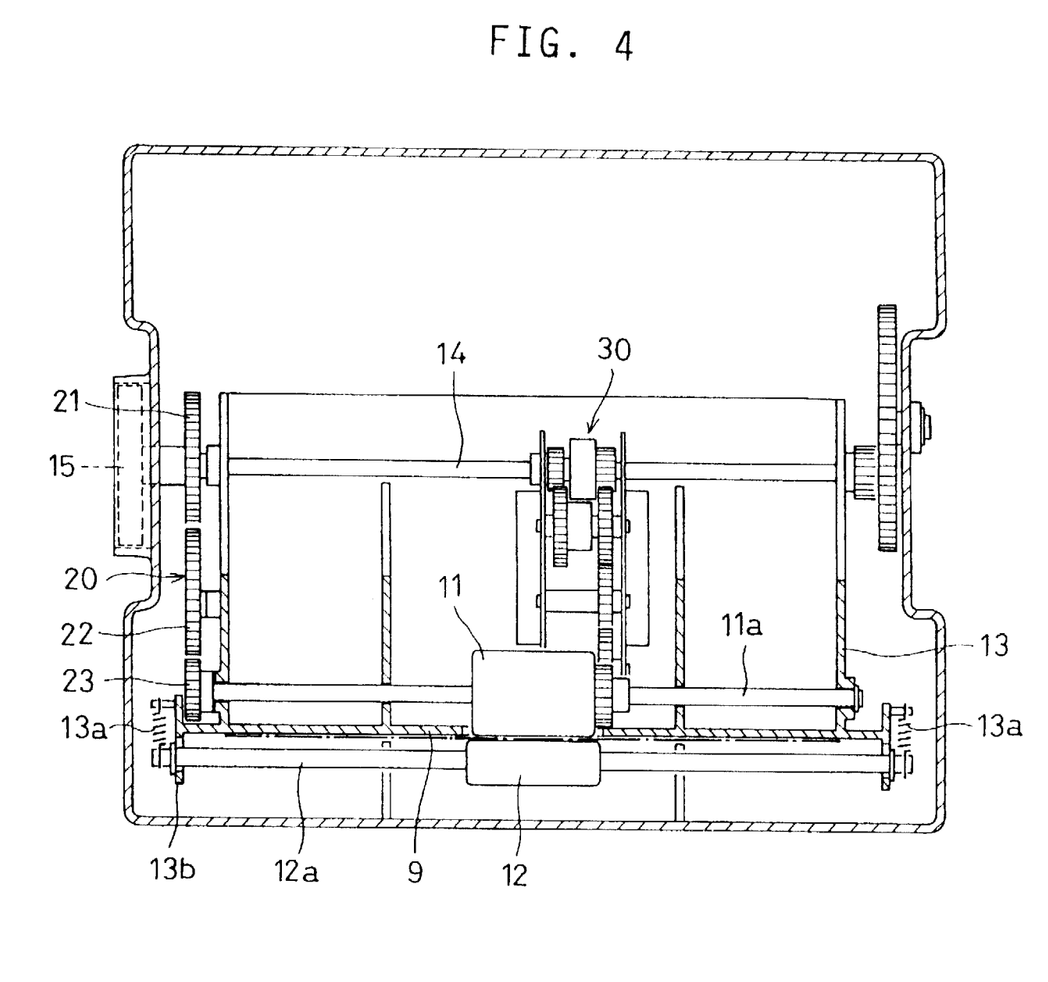
FIG. 4 is a sectional view taken along line IV—IV of FIG. 3.

As shown in FIG. 4, the press roller 12 has its roller shaft 12a supported by support pieces 13b provided near a paper guide surface of the paper guide 9 so as to be movable toward the feed roller 11. Springs 13a urge the roller shaft 12a to press the press roller 12 against the feed roller 11.

Referring back to FIG. 3, a drive shaft 14 is provided under the core shaft 5. As shown in FIG. 4, it has its ends rotatably supported on the side plates 13 of the paper guide 9 and has a driven gear 15 mounted to one end thereof outside the magazine case 1.

As shown in FIGS. 1 and 2, the driven gear 15 is adapted to engage a driving gear 17 provided at a magazine setting portion 16 when the magazine case 1 is set on the portion 16.

Figure 5:
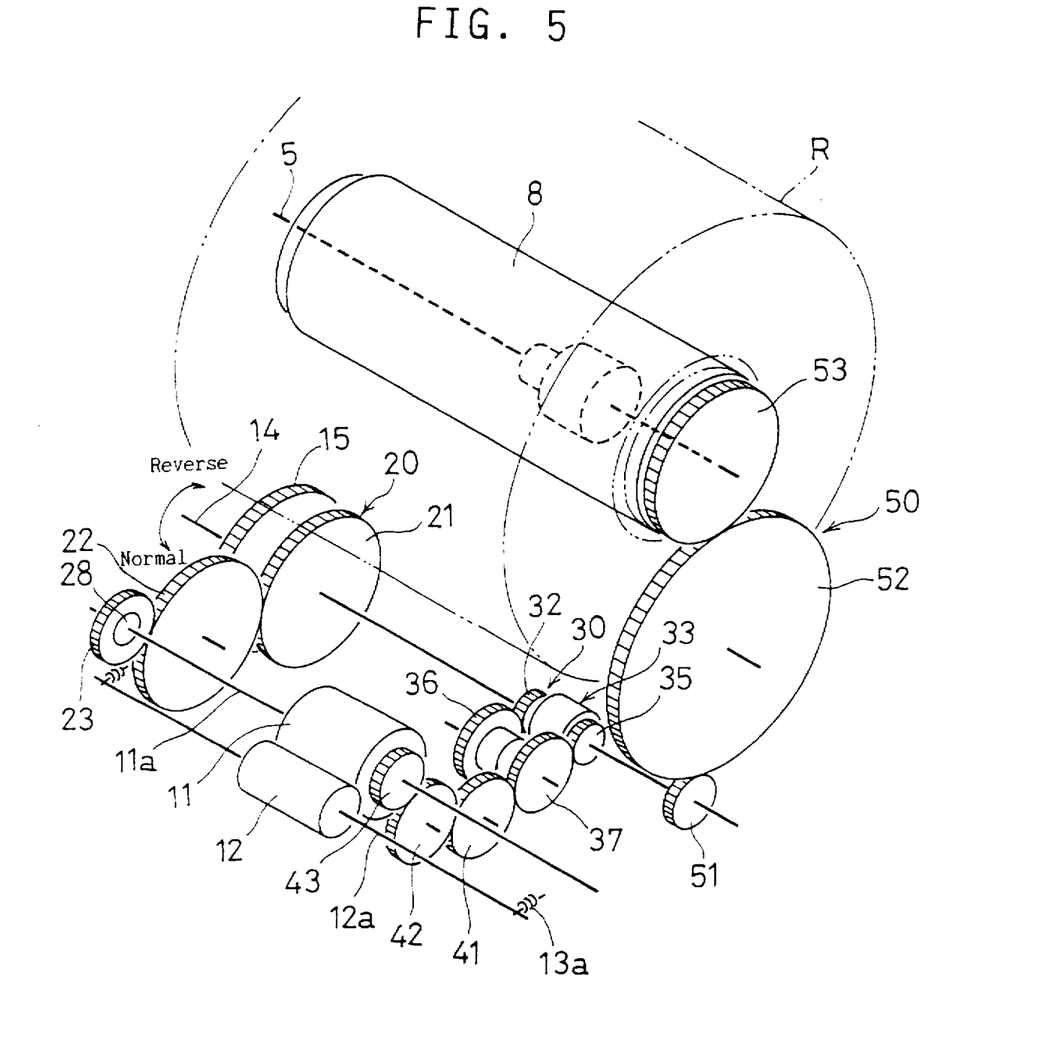
FIG. 5 is a perspective view of the rotation transmission mechanism for the feed roller and that for the core.

Referring to FIG. 5, between the drive shaft 14 and the roller shaft 11a of the feed roller 11, there are provided a normal rotation transmission 20 for transmitting the rotation of the drive shaft 14 in a normal direction and a reverse rotation transmission 30 for transmitting the rotation of the drive shaft 14 in a reverse direction.

The normal rotation transmission 20 comprises a first gear 21 mounted on the drive shaft 14, a second gear 22 in mesh with the first gear 21, and a third gear 23 mounted on the roller shaft 11a of the feed roller 11.

Figure 8A:
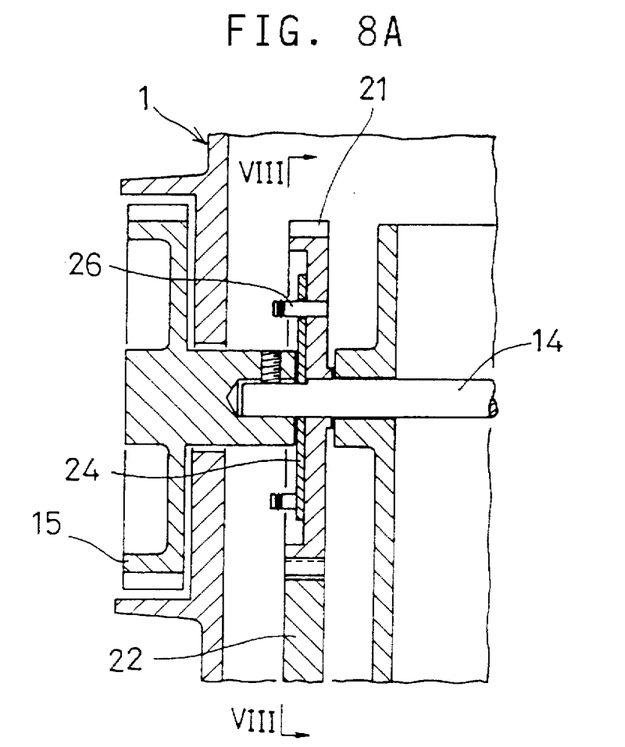
FIG. 8A is a sectional view of the driven gear.
Figure 8B:
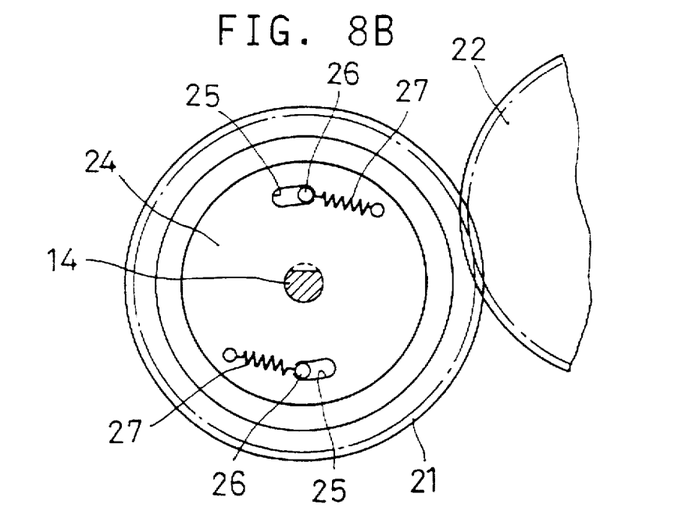
FIG. 8B is a sectional view taken along line VIII—VIII of FIG. 8A.

As shown in FIGS. 8A and 8B, the first gear 21 is rotatably mounted on the drive shaft 14. A transmission plate 24 fixed to the drive shaft 14 is in contact with one side of the first gear 21.

The transmission plate 24 has elongated holes 25 in which is received a pin 26 provided on one side of the first gear 21. A spring 27 biases the pin 26 into abutment with one end of the elongated hole 25.

As the drive shaft 14 is rotated, the first gear 21 is rotated because the pin 26 is in abutment with the end of the elongated hole 25. Rotation of the first gear 21 is transmitted through the second gear 22 to the third gear 23.

Turning back to FIG. 5, a one-way clutch 28 is disposed between the third gear 23 and the roller shaft 11a of the feed roller 11. It is adapted to lock up when the third gear 23 is rotating in the normal direction, thereby transmitting the rotation of the third gear 23 to the roller shaft 11a.

Figure 7:
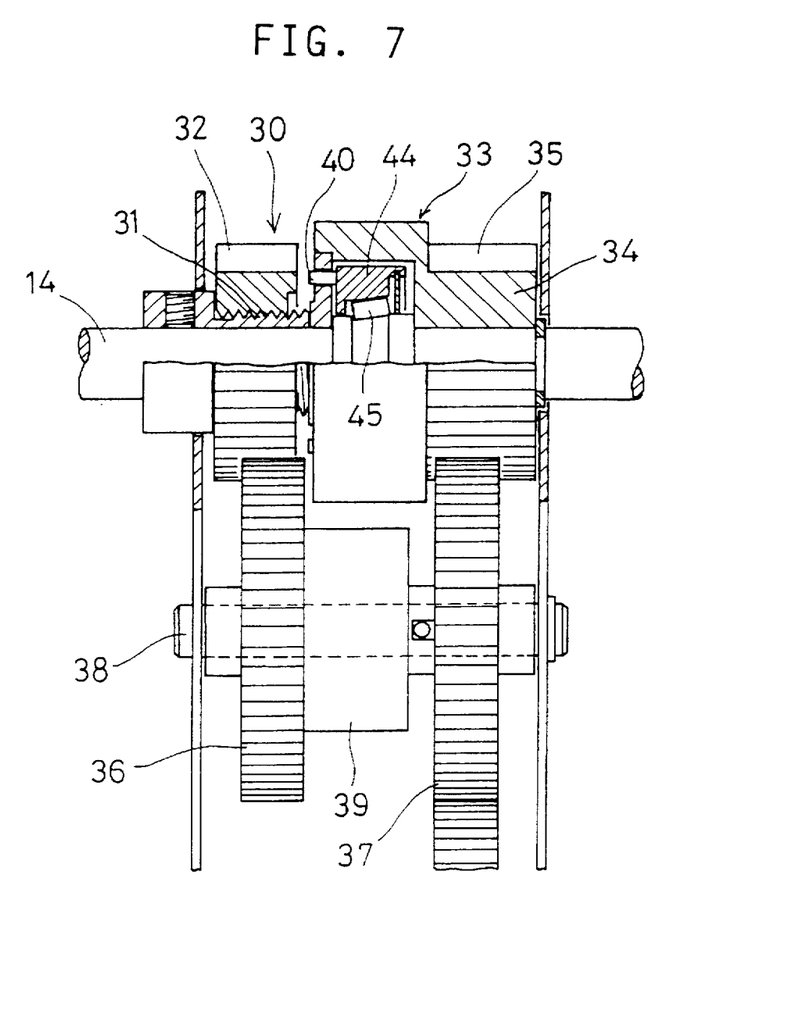
FIG. 7 is a sectional view of the reverse rotation transmission.

As shown in FIGS. 5 and 7, the reverse rotation transmission 30 comprises a threaded shaft 31 fixed to the drive shaft 14, a first gear 32 threaded on the threaded shaft 31, and a clutch 33 supported on the drive shaft 14 on one side of the first gear 32. A second gear 35 is mounted around a housing 34 of the clutch 33.

The first gear 32 is in mesh with a third gear 36, while the second gear 35 is in mesh with a fourth gear 37 provided coaxially with the third gear 36.

The third gear 36 and the fourth gear 37 are rotatably supported on a gear support shaft 38. A torque limiter 39 is mounted between the gear support shaft 38 and the third gear 36.

The torque limiter 39 applies a load to the third gear 36 and frees it when the load exceeds a predetermined value.

The load applied to the third gear 36 prevents the rotation of the first gear 32. While the drive shaft 14 is rotating in the normal direction, the first gear 32, threaded on the threaded shaft 31, is moved leftwardly in FIG. 7. While the drive shaft 14 is rotating in the reverse direction, it is moved rightwardly.

The clutch 33 has a knob 40. When the first gear 32 is moved rightwardly, it pushes the knob 40, which in turn pushes an inner ring 44 of the clutch until rollers 45 between the inner ring 44 and the drive shaft 14 engage both the inner ring 44 and the drive shaft 14, so that the housing 34 is rotated in the same direction as the drive shaft 14.

Rotation of the housing 34 is transmitted to the fourth gear 37. Rotation of the fourth gear 37 is in turn transmitted through a fifth gear 41 and a sixth gear 42 to a seventh gear 43 fixed to the roller shaft 11a.

As seen in FIG. 5, a rotation transmission mechanism 50 is provided between the drive shaft 14 and the core 8. Rotation of the drive shaft 14 is transmitted to the core 8 after slowed down by the rotation transmission mechanism 50 so that a constant tension is always applied to the paper unrolled from the paper roll R.

The rotation transmission mechanism 50 comprises a first gear 51 fixed to the drive shaft 14, a second gear 52 in mesh with the first gear 51, and a third gear 53 in mesh with the second gear 52.

Figure 6:
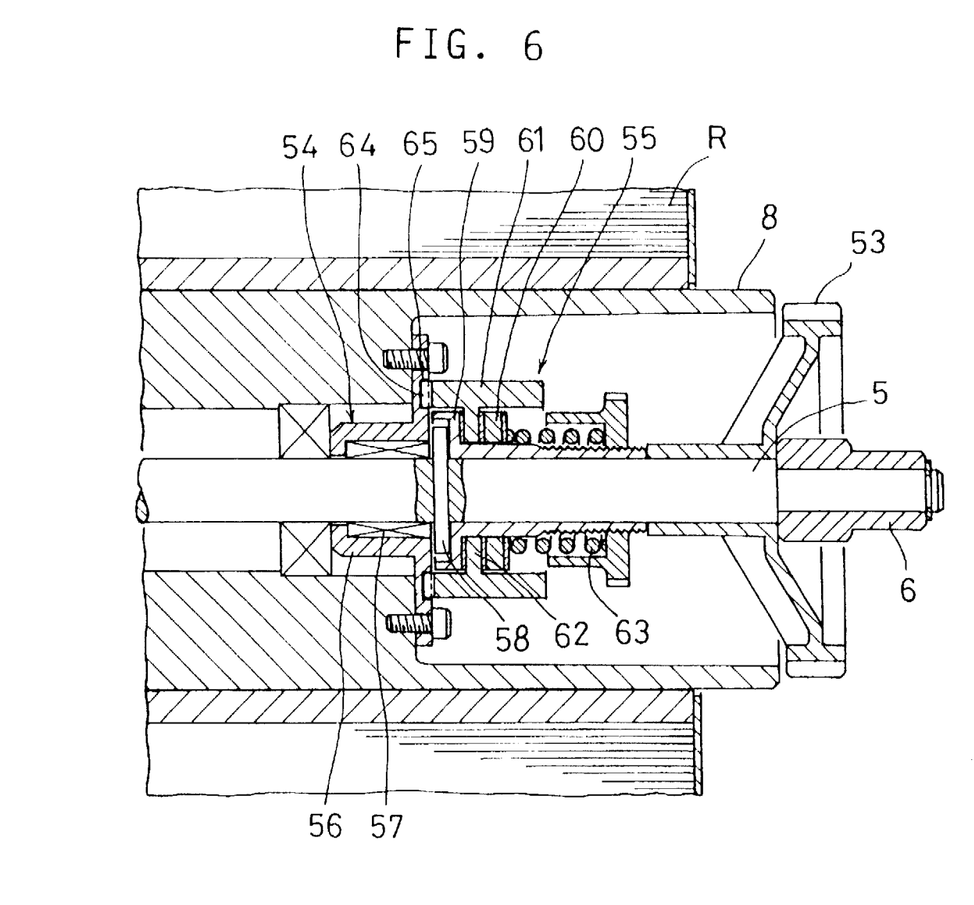
FIG. 6 is a partial sectional view of the core.

Since the third gear 53 is fixed to the core shaft 5 as shown in FIG. 6, rotation of the drive shaft 14 is transmitted to the core shaft 5.

A one-way clutch 54 and a torque limiter 55 are mounted between the core shaft 5 and the core 8 (FIG. 6). The one-way clutch 54 comprises an outer ring 56 fixed to the core 8, and engaging elements 57 mounted between the core shaft 5 and the outer ring 56. When the core shaft 5 rotates in a normal direction, the engaging elements 57 get locked, thus transmitting the rotation of the core shaft 5 to the core 8.

The torque limiter 55 comprises a fixed friction plate 59 nonrotatably mounted on the core shaft 5 by means of a pin 58, a movable friction plate 60 axially movably mounted on the core shaft 5, and a torque transmission sheath 61 having a flange 62 provided on the inner periphery thereof and inserted between the friction plates 59 and 60. The movable friction plate 60 is biased by a spring 63 toward the fixed friction plate 59.

The torque transmission sheath 61 has a plurality of claws 64 on its end face at one end thereof so as to engage in holes 65 formed in the outer ring 56 of the one-way clutch 54.

The torque limiter 55 transmits the reverse rotation of the core shaft 5 to the core 8 through the outer ring 56. While the core 8 is rotating faster than the core shaft 5, the torque limiter 55 allows the core shaft 5 and the core 8 to slip relative to each other.

The rotation transmission mechanism 50 and the normal rotation transmission 20 control the core 8 and the feed roller 11, respectively, so that the peripheral speed of the feed roller 11 in the paper feeding direction is higher than the peripheral speed of the paper roll R in the normal direction, i.e. paper feeding direction, when its diameter is maximum.

Also, the rotation transmission mechanism 50 and the reverse rotation transmission 30 control the core 8 and the feed roller 11, respectively, so that the peripheral speed of the feed roller 11 in the paper rewinding direction is lower than the peripheral speed of the paper roll R in the reverse direction, i.e. paper rewinding direction, when its diameter is minimum.

When the paper magazine of the embodiment is set in the magazine setting portion 16 of a photoprinter, the driven gear 15 is brought into mesh with the driving gear 17 of the photoprinter as shown in FIG. 2.

With the paper magazine set in position, paper P is fed and rewound in the manner described below.

(1) When feeding paper

The driven gear 15 and the drive shaft 14 are rotated in the normal direction by rotating the driving gear 17. As the drive shaft 14 is rotated, the transmission plate 24 shown in FIGS. 8A and 8B is rotated, so that the pin 26 abuts one end of the elongated hole 25. The first gear 21 is thus rotated.

Rotation of the first gear 21 is transmitted through the second gear 22 to the third gear 23. Since the third gear 23 is rotated in the same direction as the drive shaft 14, the one-way clutch 28 shown in FIG. 5 locks up. The roller shaft 11a and the feed roller 11 are thus rotated in the normal direction, so that paper P inserted between the feed roller 11 and the press roller 12 is fed toward the exposure unit of the photoprinter.

While the paper P is being fed, the rotation of the drive shaft 14 is transmitted to the third gear 53 through the first gear 51 and the second gear 52 of the rotation transmission mechanism 50 shown in FIG. 5. The core shaft 5 is thus rotating in the normal direction. Its rotation is transmitted through the one-way clutch 54 to the core 8, so that the paper roll R is rotated in the normal direction to feed paper P.

In this state, the peripheral speed of the paper roll R is set to be slower than the peripheral speed of the feed roller 11, so that suitable tension is applied to the paper P being fed.

While the paper P is being fed by rotating the feed roller 11 in the normal direction, the paper roll R is forcibly rotated in the same direction as the feed roller 11. If the peripheral speed of the paper roll R exceeds that of the feed roller 11, the one-way clutch 54 shown in FIG. 6 will slip. Thus, it is possible to feed paper P with suitable tension applied thereto.

It is thus possible to prevent slip between paper P and the feed roller 11, so that paper P can be fed at a predetermined speed with high accuracy.

As the drive shaft 14 rotates, the first gear 32 of the reverse rotation transmission 30 in FIG. 7 is moved to the left in FIG. 7, separating from the knob 40. The clutch 33 is now rotatable relative to the drive shaft 14. It is thus rotated by the roller shaft 11a through the seventh gear 43, sixth gear 42, fifth gear 41, fourth gear 37 and second gear 35.

(2) When rewinding paper

The driven gear 15 and the drive shaft 14 are rotated in the reverse direction by rotating the driving gear 17. As the drive shaft 14 is rotated in the reverse direction, the first gear 32 of the reverse rotation transmission 30 shown in FIG. 7 is moved rightwardly in FIG. 7 to push the knob 40 and engage the clutch 33.

Now the drive shaft 14 is coupled to the housing 34 of the clutch 33 through the rollers 45, inner ring 44 and knob 40. The housing 34 is thus rotated in reverse.

Rotation of the housing 34 is transmitted through the fourth gear 37, fifth gear 41 and sixth gear 42 (shown in FIG. 5) to the seventh gear 43, so that the feed roller 11 is rotated in reverse to rewind paper P.

Also, the rotation of the drive shaft 14 is transmitted through the first gear 51 and the second gear 52 of the rotation transmission mechanism 50 (FIG. 5) to its third gear 53. The core shaft 5 is thus rotated in reverse.

Rotation of the core shaft 5 is transmitted through the claws 64 of the torque transmission sheath 61 of the torque limiter 55 and the holes 65 formed in the clutch outer ring 56 to the core 8. The paper roll R is thus rotated in the paper rewinding direction.

In this state, the peripheral speed of the paper roll R when its diameter is minimum is set to be faster than the peripheral speed of the feed roller 11, so that it is possible to rewind paper without wrinkling or slackening.

As the drive shaft 14 is rotated in reverse, the transmission plate 24 shown in FIGS. 8A and 8B is rotated, so that the pin 26 abuts the other end of the elongated hole 25. The first gear 21 is thus rotated. Rotation of the first gear 21 is transmitted through the second gear 22 to the third gear 23. In this state, the one-way clutch 28 is disengaged, so that no torque is transmitted to the roller shaft 11a. The feed roller 11 is thus rotated only in the paper rewinding direction.

When the paper P is fed again after rewound, the knob 40 of the clutch 33 shown in FIG. 7 is pushed by the first gear 32. Thus, when the paper P is fed again, the roller shaft 11a is supposed to be rotated both by the normal rotation transmission 20 and the reverse rotation transmission 30 at different speeds.

But actually, this will never happen. That is, the rotation of the drive shaft 14 is transmitted directly to the first gear 32 of the reverse rotation transmission 30, but not to the first gear 21 of the normal rotation transmission 20 until the one end of the elongated hole 25 abuts the pin 26. By the time the first gear 21 is rotated, however, the first gear 32 of the reverse rotation transmission 30 will move leftwardly in FIG. 7 until it separates from the knob 40, freeing the clutch 33.

Thus, the rotation of the drive shaft 14 is not transmitted to the roller shaft 11a through the reverse rotation transmission 30 any longer. That is, rotation of the drive shaft 14 is transmitted to the roller shaft 11a only through the normal rotation transmission 20. The feed roller 11 is thus rotated in the paper feed direction in the same manner as when feeding the paper.

According to this invention, while the feed roller is rotating in the paper feed direction, the core supporting the paper roll is also rotated in the paper feed direction at such a speed that the peripheral speed of the feed roller is higher than the peripheral speed of the paper roll when its diameter is maximum. Thus, the paper will never be subjected to excessively high tension while being fed, so that it is possible to feed paper at high speed with high accuracy.

While the feed roller is rotating in the paper rewinding direction, the core supporting the paper roll is also rotated in the paper rewinding direction at such a speed that the peripheral speed of the feed roller is lower than the peripheral speed of the paper roll when its diameter is minimum. Since the paper is rewound with a suitable tension applied thereto, it will never slacken or wrinkle.

It is also possible to feed the paper sandwiched between the feed roller and the press roller to any desired position. This makes it possible to omit advance rollers in the paper feed path in the photographic printer and thus to reduce cost.

What is claimed is:

1. A paper magazine comprising a magazine case, a paper roll, a core for nonrotatably supporting said paper roll, a drive shaft driven in both directions, said core and said drive shaft being mounted in said magazine case, a feed roller provided along a paper feed path leading from said paper roll to a paper outlet provided in said magazine case, a press roller pressed against said feed roller, a normal rotation transmission provided between said drive shaft and said feed roller for transmitting only rotation of said drive shaft in a normal direction to said feed roller to rotate said feed roller in a direction to feed paper, a reverse rotation transmission provided between said drive shaft and said feed roller for transmitting only rotation of said drive shaft in a reverse direction to said feed roller to rotate said feed roller in a direction to rewind paper, and a rotation transmission mechanism provided between said drive shaft and said core for transmitting the rotations of said drive shaft both in said normal and reverse directions to said core, while controlling the rotating speed of said core so that while said drive shaft is rotating in said normal direction, the peripheral speed of said feed roller is higher than the peripheral speed of said paper roll when its diameter is maximum, and while said drive shaft is rotating in said reverse direction, the peripheral speed of said feed roller is lower than the peripheral speed of said core when its diameter is minimum, thereby applying a predetermined tension to the paper unrolled from said paper roll.

2. A paper magazine as claimed in claim 1 wherein said drive shaft carries a driven gear which is brought into and out of mesh with a driving gear provided in a magazine setting portion of a photographic printer.

* * * * *